Sept. 12, 1961 J. E. HECKETHORN 2,999,678
AUXILIARY SPRING SUSPENSIONS
Filed Sept. 8, 1959
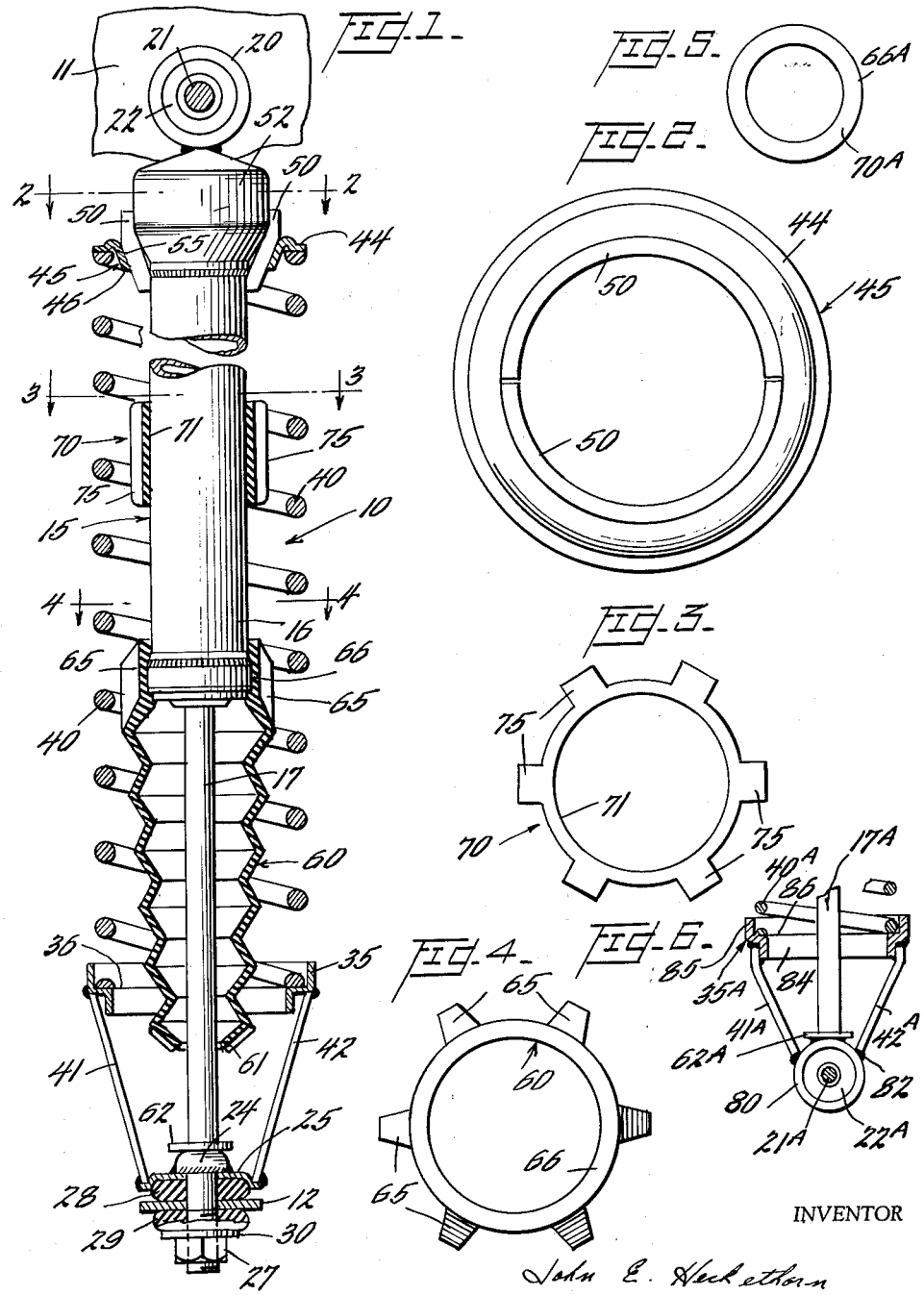
INVENTOR
John E. Heckethorn
BY
Watson, Cole, Grindle & Watson
ATTORNEYS

United States Patent Office

2,999,678
AUXILIARY SPRING SUSPENSIONS
John E. Heckethorn, Dyersburg, Tenn., assignor to Heckethorn Manufacturing & Supply Company, Dyersburg, Tenn., a corporation of Colorado
Filed Sept. 8, 1959, Ser. No. 838,726
9 Claims. (Cl. 267—8)

This invention relates to supplemental or auxiliary damped spring suspensions for vehicles such as may be employed in vehicles where the load carried may vary widely. Such devices may be used on ordinary passenger cars, and particularly on station wagons, and they serve to lend additional resilient support for the vehicle when loaded; and when their properties are intelligently selected they do not deleteriously affect the riding qualities of the main suspension when travelling light. These auxiliary suspensions also serve to substantially maintain the fore-and-aft level of the vehicle affording greater ground clearance both when loaded and unloaded.

The invention has for its general object the provision of a novel and improved suspension of this class which is simple and compact in construction, easy and economical to manufacture, and efficient and dependable in operation.

Important features of novelty of the damped suspension device provide for ease of assembly, the ability to employ a direct-acting reciprocating piston and cylinder shock absorber without structural modification of the shock absorber, and the prevention of noise and wear which might be occasioned by the supporting spring striking the shock absorber during severe conditions of travel.

Other objects and features of novelty will be apparent from the following specification when read in connection with the accompanying drawings in which one embodiment of the invention is illustrated by way of example.

In the drawings:

FIGURE 1 is a view partly in elevation and partly in vertical section of an auxiliary damped suspension device embodying the principles of the invention;

FIGURE 2 is a top plan view of certain of the spring mounting elements as seen from line 2—2 of FIGURE 1, looking in the direction of the arrows, the shock absorber proper being omitted;

FIGURE 3 is a similar view of a spring bumper ring as seen from line 3—3 of FIGURE 1;

FIGURE 4 is a top plan view of the bellows or boot element as viewed from line 4—4 of FIGURE 1;

FIGURE 5 is a similar view on a smaller scale of an alternative form of spring bumper ring and bellows collar, in which the ribs have been eliminated; and FIGURE 6 is a fragmentary view similar to the lower portion of FIGURE 1, but on a smaller scale, and showing an alternative form of lower spring seating means.

In FIGURE 1 of the drawings the novel auxiliary spring suspension is designated generally by the reference numeral 10 and serves to lend additional resilient damped support to the body or chassis of the vehicle, a portion of which is shown at 11, from the wheel and axle mounting, a part of which is indicated at 12 and may comprise a portion of a bracket secured to an appropriate part of the wheel mounting.

The novel suspension is, as indicated, designed to afford additional support to the body of the vehicle and is generally installed at the rear end of the vehicle where the added loading occurs. The supplemental supporting device 10 may be installed in a vertical position or at any advantageous inclination to the vertical, such as might be resorted to in order to resist side sway during cornering.

The shock absorber employed as the damping element of the suspension assembly is indicated generally by the reference numeral 15 and comprises the cylinder 16 containing the usual valved piston (not shown), the piston rod 17 extending through a packed opening in the bottom wall of the cylinder. The shock absorber 15 may be of any suitable construction, for example, similar to the ones covered by the following United States Patents: 2,719,612; 2,765,877; 2,774,446 and 2,821,268.

The upper end of the cylinder 16 is provided with an eye 20 which surrounds a pin 21 secured to the chassis 11, additional resiliency being afforded the connection by the rubber grommet 22. The lower end of the piston rod 17 is provided with a rigid shoulder 24 to which is secured as by welding an annular plate or washer 25. The extreme end of the piston rod 17 is threaded and a nut 27 applied thereto. Between the washer 25 and the wheel mounting bracket part 12 there is interposed a rubber washer or grommet 28 and a similar grommet 29 is interposed between the bracket part 12 and a washer 30 against which the nut 27 is adapted to bear.

Thus, the suspension device is secured at its upper and lower ends to the vehicle parts the relative motion of which it is designed to cushion and dampen.

Surrounding the lower intermediate portion of the piston rod 17 is an annulus 35 which is preferably Z-shaped in section to provide an internal shoulder 36 affording a cup-like lower spring seat for the supplemental supporting spring 40. The Z-shaped configuration also affords greater rigidity for the annulus 35. A pair of inclined struts 41 and 42 have their respective upper and lower ends welded to the opposite sides of the annulus 35 and corresponding opposite portions of the washer 25. This establishes a sufficiently rigid and braced spring seat for the spring 40.

Thus in FIGURE 1 of the drawings there has been illustrated different means for securing the upper and lower ends of the device to the chassis and wheel mountings of the vehicle respectively; an eye and grommet connection being employed at the top and a threaded rod connection at the bottom of the device. It will be clearly understood that this arrangement may be varied at the option of the manufacturer to provide eyes at the top and bottom or threaded rods at both ends of the structure. In the event that a rod is used at the top of the installation the connection may be exactly the same as at the lower end of FIGURE 1.

On the other hand, if an eye and grommet connection is employed at the bottom of the device, it will preferably be constructed according to the somewhat diagrammatic showing in FIGURE 6 of the drawings. In this embodiment the piston rod 17A is provided with a washer 62A and immediately below it there is welded the ring or eye 80.

Two struts 41A and 42A have their lower ends welded to portions of the periphery of the eye 80 as at 81 and 82. These struts diverge upwardly and their vertical end portions are welded to the spring seating cups or ring 35A, which is preferably of Z-section having a lower flange 84 and an upper flange 85, the shoulder 86 between the two flanges providing an abutment for the coil spring 40A.

The eye 80 of course surrounds a connecting pin 21A through the intermediary of a rubber bushing or grommet 22A.

The upper end of the spring 40 is seated against the horizontal peripheral flange 44 of the sleeve ring 45, the lower downwardly projecting flange 46 of which is tapered to a conical configuration corresponding to the outer lower portions of the split sleeve elements 50. The upper portions of these semi-circular sleeve parts 50 embrace the bulged or dome portion 52 of the shock absorber cylinder, and the lower inner portions fit around the main cylindrical portion of the shock absorber just below the dome.

It will be noted that the sleeve ring 44 has a bend formed in it which provides a pronounced recess or fillet 55 just above the outer tapered portion of the lower flange 46. The terminal convolution of the spring 40 is flattened as clearly shown to fit snugly against the undersurface of the upper flange 44 of the ring 45, and the inner edge of this flattened portion fits snugly against the conical surface of the flange 46 at the point where the lower surface of the flange 44 intersects the tapered surface of the lower flange. The diameter of this circle of intersection determines the datum diameter of the spring and affords a snug fit which serves to prevent rattling.

It will be readily perceived that the device may be dismantled by compressing the spring 40, lowering the ring 44, and removing the halves of the split sleeve 50, whereupon the ring 44 and the spring may be withdrawn over the dome 52 of the shock absorber, the inner diameter of the lower flange 46 of the ring 45 being just enough greater than the diameter of the dome 52 to permit this.

It will be noted that the tapered split sleeve parts are somewhat elongated in the axial direction as compared with the axial width of the ring 45, and this is advantageous in facilitating the removal of the split ring sections when the spring is compressed for this purpose. This provision insures that the sleeve sections will not suddenly be projected out of position either during removal or when subjected to sudden jars during use.

It is the usual practice to apply a bellows or boot 60 to the lower end of the cylinder of a shock absorber of this construction, and one type of boot employed is tapered somewhat so that the lower end comes rather close to fitting the piston rod 17, a slight clearance being afforded for the passage of air during operation of the shock absorber. The lower end 61 of the boot is adapted to strike against the washer 62 provided on the piston rod 17 and the boot is compressed when the piston rod is moving toward retracted position. Very obviously the position shown in FIGURE 1 of the drawings is that which the parts assume in fully extended condition. It is also obvious that upon compression of the entire device the convolutions of the spring 40 will come much closer together and the bottom spring seat 35 will move to the vicinity of the lower end of the cylinder 16 of the shock absorber.

Although the upper neck portion 66 of the boot 60 may assume a purely cylindrical form as suggested at 66A in FIGURE 5 of the drawings, it may be modified by the provision of a plurality of radial ribs 65 at the upper end of the boot, these ribs 65 being formed as extensions on the approximately cylindrical neck portion 66 at the upper end of the boot which is elastically retained upon the lower end of the cylinder 16 of the shock absorber. These radial ribs are clearly shown in FIGURE 4 of the drawings. It will be clearly understood how the upper or neck portion will effectively serve as a bumper to sustain the shock of contact of the intermediate convolutions of the spring 40, in case unusual vibration of the springs, as during travel over exceptionally rough terrain, would cause the convolutions to collide with or strike the shock absorber 15.

As a further precautionary measure to prevent the convolutions of the spring 40 striking the cylinder 16 of the shock absorber a supplemental bumper ring 70 may be employed, this ring being made of a rubber-like material similar to that employed in the construction of the boot or bellows 60. This ring may have a purely cylindrical configuration as suggested at 70A in FIGURE 5, but for certain purposes it may assume the form shown in FIGURE 3 of the drawings where a central cylindrical portion 71 is provided with radial ribs somewhat similar to those shown at 65 in connection with the upper or neck portion of the bellows. The ring is either elastically retained around the cylinder 16 of the shock absorber at a selected point, or may be adhesively secured thereto.

This supplemental ring 70 is preferably of rather short dimension longitudinally of the device and thus does not seriously interfere with the radiation of heat from the cylinder 16 of the shock absorber and need not be provided with any internal channels for limiting the contact of the body portions 71 with the cylinder. Furthermore, the ring may, as suggested, be adjusted longitudinally of the cylinder to any desired point where it may supplement the ribs 65 of the bellows in cushioning any collision of the convolutions of the spring 40 with the shock absorber parts.

It will be understood that various changes and modifications may be made in the embodiment illustrated and described herein without departing from the scope of the invention as defined by the following claims.

Having thus described the invention, what is claimed as new and desired to be secured by Letters Patent is:

1. A damped resilient suspension device for connection between sprung and unsprung members comprising, in combination, a shock absorber of the direct acting type having a telescoping cylinder and piston rod, the piston rod issuing through a packed opening in the inner end of said cylinder, means for securing the outer or remote end of the cylinder of the shock absorber to one of said members and means for securing the remote end of the piston rod to the other of said members; a coil supporting spring surrounding said shock absorber, an annular spring seat carried by said shock absorber cylinder near its remote end, and an annular spring seat carried by the remote end of the piston rod, the coil spring being compressed between said seats and adapted to surround the greater portions of both the cylinder and piston rod in all positions thereof; a bellows-like boot element of rubber-like material having a restricted neck portion at one end thereof snugly and elastically received about the inner end portion of said cylinder, and an annularly pleated main portion extending away from said inner end portion of the cylinder to surround and afford protection to the variably exposed portions of said piston rod, said neck portion of the boot having a maximum outside diameter at least as great as that of any of the pleated portions of said boot element, said neck portion itself acting as a buffer between the inner end portion of the shock absorber cylinder and the intermediate surrounding convolutions of the coil spring; and a supplemental buffer element comprising a relatively narrow annular band of rubber-like material surrounding an intermediate portion of said shock absorber cylinder to prevent abrasive contact between the intermediate portion of the cylinder and the convolutions of the spring surrounding said portion.

2. A damped resilient suspension device for connection between sprung and unsprung members comprising, in combination, a shock absorber of the direct acting type having a telescoping cylinder and piston rod, the piston rod issuing through a packed opening in the inner end of said cylinder, means for securing the cylinder of the shock absorber to one of said members and means for securing the piston rod to the other of said members; a coil supporting spring surrounding said shock absorber, an annular spring seat carried by said shock absorber cylinder near its outer or remote end, and an annular spring seat secured to the remote end of the piston rod, the coil spring being compressed between said seats and adapted to surround the greater portions of both the cylinder and piston rod in all positions thereof, the spring seat secured to said piston rod comprising a flanged annulus of an internal diameter corresponding to the diameter of the coil spring, a diametric projection fixed on said piston rod adjacent the outer end thereof and of smaller diameter than that of the spring seat annulus, and a pair of upwardly divergent strut bars extending from opposite sides of said projections to correspondingly opposite sides of said annulus and having their respective ends welded to the flange and the annulus.

3. A damped resilient suspension device for connection between sprung and unsprung members comprising, in combination, a shock absorber of the direct acting type having a telescoping cylinder and piston rod, the piston rod issuing through a packed opening in the inner end of said cylinder, means for securing the cylinder of the shock absorber to one of said members and means for securing the piston rod to the other of said members; a coil supporting spring surrounding said shock absorber, an annular spring seat carried by said shock absorber cylinder near its outer or remote end, and an annular spring seat secured to the remote end of the piston rod, the coil spring being compressed between said seats and adapted to surround the greater portions of both the cylinder and piston rod in all positions thereof, and means for rigidly securing said spring seat to the remote end portion of said piston rod, said spring seat comprising a flanged socket element of an internal diameter corresponding to the diameter of the coil spring, an eye secured on the lower end of said piston rod and comprising a portion of the means for securing the piston rod to the other of said members, a pair of upwardly divergent strut bars having their lower ends rigidly secured to diametrically opposite portions of the periphery of said eye and extending upwardly to abut diametrically opposite portions of said socket element and having their respective ends welded to said eye and said socket element.

4. A damped resilient suspension device for connection between sprung and unsprung members comprising, in combination, a shock absorber of the direct acting type having a telescoping cylinder and piston rod, the piston rod issuing through a packed opening in the inner end of said cylinder, means for securing the cylinder of the shock absorber to one of said members and means for securing the piston rod to the other of said members; a coil supporting spring surrounding said shock absorber, an annular spring seat detachably secured to said shock absorber cylinder near its outer or remote end, and an annular spring seat secured to the remote end of the piston rod, the coil spring being compressed between said seats and adapted to surround the greater portions of both the cylinder and piston rod in all positions thereof, the remote end portion of said shock absorber cylinder being bulged to a diameter greater than that of the major portion of the cylinder, a split sleeve comprising two semi-annular parts and being internally curved to approximately conform to and fit against the lower edge of the bulged end of said cylinder and having a tapering frusto-conical outer surface, an abutment ring surrounding said split sleeve and conforming internally to the taper of the outer surface of said split sleeve, and extending radially outwardly to constitute the said cylinder-carried spring seat for the coil spring.

5. The suspension device as set forth in claim 4 in which the split sleeve is somewhat elongated in the axial direction so that the taper fit between the sleeve and the abutment ring may be gradual and prolonged so as to prevent accidental displacement of the sleeve under shock.

6. The suspension device as set forth in claim 4, in which said abutment ring comprises the tapered portion and an outwardly extending flange which is connected by a curved portion providing a pronounced fillet at the angular junction of the recited parts of the ring where the end of the spring seats.

7. A damped resilient suspension device for connection between sprung and unsprung members comprising, in combination, a shock absorber of the direct acting type having a telescoping cylinder and piston rod, the piston rod issuing through a packed opening in the inner end of said cylinder, means for securing the cylinder of the shock absorber to one of said members and means for securing the piston rod to the other of said members; a coil supporting spring surrounding said shock absorber, an annular spring seat detachably secured to said shock absorber cylinder near its outer or remote end, and an annular spring seat carried by the remote end of the piston rod, the coil spring being compressed between said seats and adapted to surround the greater portions of both the cylinder and piston rod in all positions thereof, the remote end portion of said shock absorber cylinder being bulged to a diameter greater than that of the major portion of the cylinder, a split sleeve comprising two semi-annular parts and being internally curved to approximately conform to and fit against the lower edge of the bulged end of said cylinder and having a tapering frusto-conical outer surface, a flanged abutment ring surrounding said split sleeve and conforming internally to the taper of said split sleeve, and having an outwardly extending flange constituting the said cylinder-carried spring seat for the coil spring, and means for rigidly securing said second named spring seat to the end of said piston rod.

8. A damped resilient suspension device for connection between sprung and unsprung members comprising, in combination, a shock absorber of the direct acting type having a telescoping cylinder and piston rod, the piston rod issuing through a packed opening in the inner end of said cylinder, means for securing the outer or remote end of the cylinder of the shock absorber to one of said members and means for securing the remote end of the piston rod to the other of said members; a coil supporting spring surrounding said shock absorber, an annular spring seat detachably secured to said shock absorber cylinder near its remote end, and an annular spring seat carried by the remote end of the piston rod, the coil spring being compressed between said seats and adapted to surround the greater portions of both the cylinder and piston rod in all positions thereof; a bellows-like boot element of rubber-like material having a neck portion at one end thereof snugly received about the inner end portion of said cylinder, and an annularly pleated main portion extending away from said inner end portion of the cylinder to surround and afford protection to the variably exposed portions of said piston rod; said neck portion of the boot acting as a buffer between the shock absorber cylinder and the intermediate surrounding convolutions of the coil spring, the remote end portion of said shock absorber cylinder being bulged to a diameter greater than that of the major portion of the cylinder, a split sleeve comprising two semi-annular parts and being internally curved to approximately conform to and fit against the lower edge of the bulged end of said cylinder and having a tapering frusto-conical outer surface, a flanged abutment ring surrounding said split sleeve and conforming internally to the taper of said split sleeve, and having an outwardly extending flange constituting the said cylinder-carried spring seat for the coil spring, and means for rigidly securing said second named spring seat to the end of said piston rod.

9. The resilient suspension device set forth in claim 8 in which, in fully extended position, the outer end of said boot is spaced axially somewhat from the remote end of said piston rod, and in which said means for securing the second named spring seat to the end of the rod comprises struts extending inwardly from the end of the rod to position the spring seat at least as far as the outermost point of extension of the boot.

References Cited in the file of this patent

UNITED STATES PATENTS

| | | |
|---|---|---|
| 2,660,449 | MacPherson | Nov. 24, 1953 |
| 2,690,786 | Sedlock | Oct. 5, 1954 |
| 2,765,877 | De Carbon | Oct. 9, 1956 |
| 2,823,915 | De Carbon | Feb. 18, 1958 |
| 2,874,955 | McIntyre et al. | Feb. 24, 1959 |
| 2,896,938 | Walker | July 28, 1959 |

FOREIGN PATENTS

| | | |
|---|---|---|
| 422,686 | Great Britain | Jan. 16, 1935 |
| 719,661 | Great Britain | Dec. 8, 1954 |
| 811,556 | Great Britain | Apr. 8, 1959 |